Figure 1:
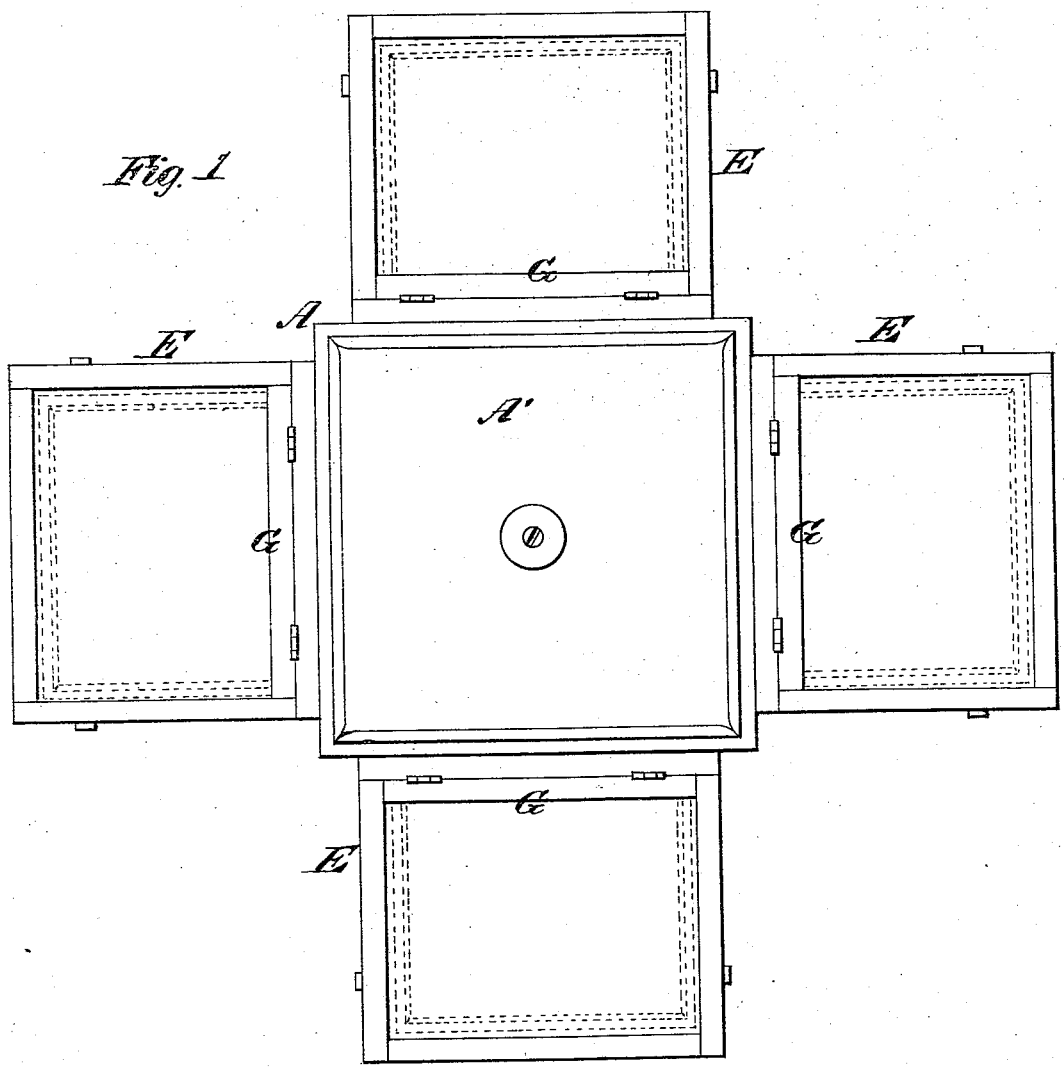

H. COWDERY.
Milk-Coolers.

No. 156,915.

2 Sheets--Sheet 1.

Patented Nov. 17, 1874.

WITNESSES
Robert Everett
H. C. Hollingshead

INVENTOR
Hervey Cowdery
Chipman & Burr & Co,
Attorneys

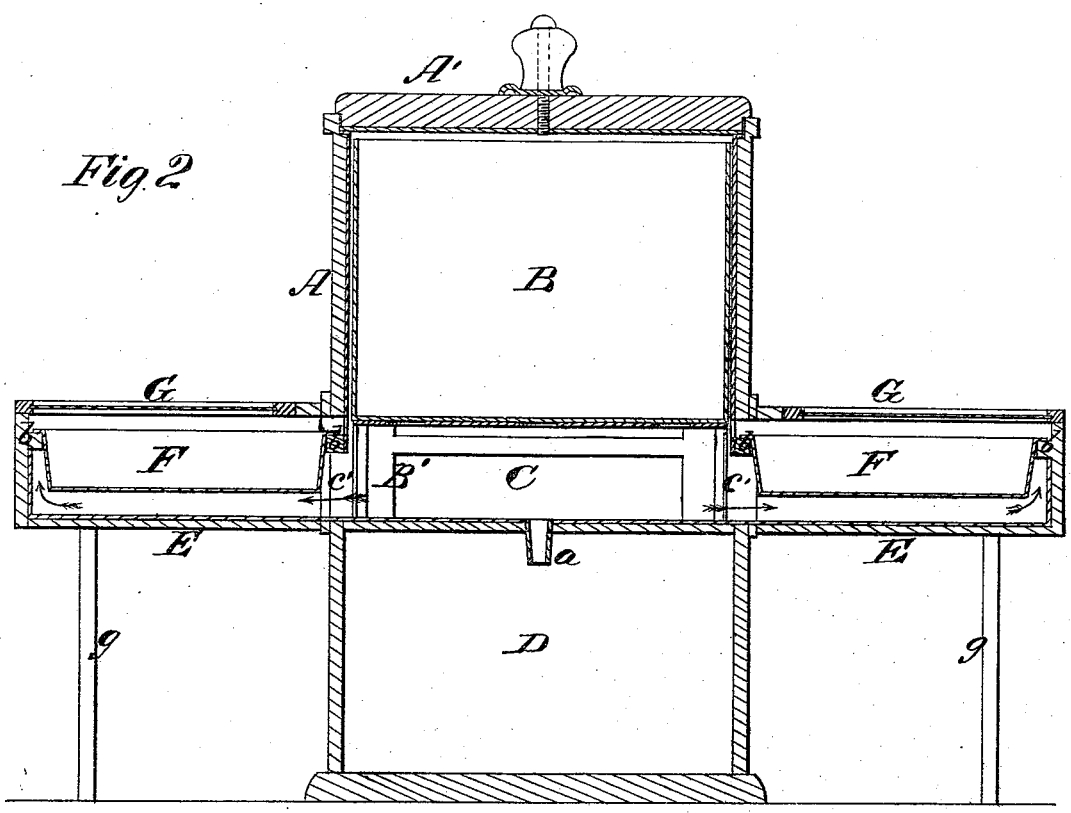

UNITED STATES PATENT OFFICE.

HERVEY COWDERY, OF ST. JOHNSBURY, VERMONT.

IMPROVEMENT IN MILK-COOLERS.

Specification forming part of Letters Patent No. 156,915, dated November 17, 1874; application filed August 19, 1874.

*To all whom it may concern:*

Be it known that I, HERVEY COWDERY, of St. Johnsbury, in the county of Caledonia and State of Vermont, have invented a new and valuable Improvement in Milk-Coolers; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a top view of my cooling apparatus for milk. Fig. 2 is a sectional view of the same.

This invention has relation to apparatus for keeping milk cool; and it consists in a novel construction of an apparatus whereby the milk is exposed to an atmosphere of cool air above and beneath the pans containing it, thereby obviating the many objections to the use of water for this purpose.

In the annexed drawings, A designates a rectangular chest containing an ice-box, B, and provided with a tightly-fitting cover, A'. The ice-box B is mounted upon a stool, B', which raises it above the bottom of the chest A, and forms a chamber, C, for receiving the descending currents of cold air. Beneath the ice-chest and the chamber C is a receptacle, D, for containing cream, butter, and other things which it is desirable to keep cool, which receptacle is in communication with the chamber C by means of one or more pipes $a$. E E E E designate receptacles for milk-pans F, which pans rest by their flanges upon ledges $b$, and are thus sustained above the bottoms of the receptacles E, which bottoms are all in the same horizontal plane as the bottom of the chamber C. The receptacles E are provided with covers G, which are rectangular hinged frames inclosing glass plates.

In practice I shall arrange the pans F so that they can be readily tilted for pouring out their contents without having to lift them bodily out of their receptacles.

When ice or any suitable freezing-mixture is put into the box B and the cover A' shut, the cold air will descend into the chamber C, and from thence pass out through openings $c'$ $c'$ into the spaces below the pans F, thereby keeping the contents thereof cool and at a uniform temperature.

The chest A, and also the receptacles E are lined with zinc, and the outer ends of the receptacles E are mounted upon legs $g$, as shown in Fig. 2.

What I claim as new, and desire to secure by Letters Patent, is—

One or more receptacles, E, for containing milk-pans, in combination with passages $c'$ $c'$ communicating with a chamber, C, below the ice-box B in chest A, substantially in the manner and for the purposes described.

In testimony that I claim the above I have hereunto subscribed my name in the presence of two witnesess.

HERVEY COWDERY.

Witnesses:
P. D. BLODGETT,
P. F. BLODGETT.